United States Patent [19]

Sobolev et al.

[11] 4,126,473
[45] Nov. 21, 1978

[54] FLAME RETARDING COMPOSITIONS FOR CELLULOSIC BOARDS

[75] Inventors: Igor Sobolev, Orinda; Erwin Panusch, Livermore, both of Calif.

[73] Assignee: Kaiser Aluminum & Chemical Corporation, Oakland, Calif.

[21] Appl. No.: 808,017

[22] Filed: Jun. 20, 1977

[51] Int. Cl.² ............................................. C09K 3/28
[52] U.S. Cl. ............................ 106/15 FP; 428/921; 252/8.1; 162/159; 162/181 A; 162/181 B
[58] Field of Search ............ 106/15 FP; 260/2.5 AJ, 260/2.5 FP, DIG. 24; 264/122; 428/921, 326, 403; 252/8.1; 162/159, 181 A, 181 B

[56] References Cited

U.S. PATENT DOCUMENTS

| 1,804,417 | 5/1931 | Herting | 162/159 |
| 2,632,743 | 1/1952 | Eckert | 106/15 FP |
| 3,819,518 | 6/1974 | Endler | 428/921 |
| 3,865,760 | 2/1975 | Pitts et al. | 260/45.7 R |
| 3,897,387 | 7/1975 | O'Shaughnessy | 105/15 FP |

Primary Examiner—Lorenzo B. Hayes
Assistant Examiner—W. Thompson
Attorney, Agent, or Firm—Paul E. Calrow; Andrew E. Barlay

[57] ABSTRACT

Synergistically performing flame retarding compositions are provided for cellulosic boards, such as hardboards, particleboards and fiberboards. The synergistically performing compositions consist of three components, namely, an aluminous material, a naturally occurring borate-containing mineral and a phosphate or sulfate salt. Incorporation of these compositions in the boards allows consistent production of flame-retarded products with a Class I or better fire rating.

12 Claims, No Drawings

FLAME RETARDING COMPOSITIONS FOR CELLULOSIC BOARDS

BACKGROUND OF THE INVENTION

In recent times, more and more interest has focused on flame retardant materials for the construction of residential, commercial and industrial buildings. Consequently, great emphasis is being placed on compositions which are capable of imparting the desired flame retardancy to building materials, such as cellulosic boards, without, however, deteriorating the essential physical properties of the final products.

Within the last few years, several flame retarding compositions have been suggested for cellulosic boards. Thus, in U.S. Pat. No. 4,008,214 Feb. 15, 1977), hard and particleboards have been rendered flame retardant by incorporating in these boards a synergistically acting composition containing alumina hydrate in combination with a melamine-formaldehyde phosphate, urea-formaldehyde phosphate or dicyanamide-formaldehyde phosphate.

In German Application (Offenlegungsschrift) No. 2,627,682 — Moore et al, published on Jan. 20, 1977, cellulosic products, such as hardboards, are rendered flame retardant by incorporation in the boards a composition consisting of alumina hydrate and a boron source. As boron source $B_2O_3$, $H_3BO_3$ and ammonium borates are described. In this published application, reference is also made to compositions containing mixtures of alumina hydrate with monoammonium phosphate or diammonium phosphate. These compositions have been found to be inferior in their flame-retarding effects for cellulosic boards.

In U.S. Pat. No. 3,865,760 (Feb. 11, 1975) — Pitts et al, rubber or plastic compositions are rendered flame retardant by incorporation of an agent consisting of a naturally occurring boron-containing mineral, such as colemanite, either alone or in combination with alumina hydrate.

In our co-pending U.S. application, Ser. No. 780,725, filed Mar. 24, 1977, now U.S. Pat. No. 4,076,580, a synergistically acting ulexite-alumina hydrate flame-retarding composition is described, being capable of imparting Class I fire rating to cellulosic boards. By careful control of the loading of this composition, a flame-retarded product is obtained which conforms to Class I fire rating, while exhibiting suitable mechanical properties.

It has now been discovered that significantly improved flame retardancy can be imparted to cellulosic boards, while simultaneously retaining the important physical properties of these boards, by using a three-component flame-retarding agent consisting of a source of $Al_2O_3.xH_2O$, a naturally occurring boron-containing mineral, and an inorganic phosphate or sulfate containing cosynergist, to be defined in detail hereafter.

The instant flame-retarding composition consistently provides Class I fire ratings or better, without generation of undesirable afterglow, by the unexpected interaction of the components.

SUMMARY OF THE INVENTION

Flame-retarded cellulosic boards are provided by incorporating in the boards a flame-retarding agent consisting of (A) a source of $Al_2O_3 \cdot xH_2O$, (B) a naturally occurring boron-containing mineral and (C) an inorganic sulfate or phosphate-containing cosynergist; the source of $Al_2O_3.xH_2O$ being selected from the group of $Al_2O_3.xH_2O$, where $x$ is in the range of about 0.5–3.0 and bauxite, the boron-containing mineral is ulexite, colemanite and mixtures thereof; while the inorganic cosynergist is from the group of salts characterized by the general formulae $M_mHSO_4$, $M_m(HPO_4)_n$, $M_m(H_2PO_4)_n$, $M_m(HP_2O_7)_n$, where M is Na, K, $NH_4$, Mg and Al and $m$ depends on the valency of M; $Ca(H_2PO_4)_2$, $X_mH_{4-m}P_2O_7$, where X is Na or K; $Na_3PO_4$, and the polymeric phosphates of Na and K. In the cellulosic boards, the quantity of flame-retarding agent is kept within the range of about 20–60% by weight of the flame-retarded boards, preferably between about 35–50% by weight of the total weight of the board. In the flame-retarding agent, the weight ratios of components A:B:C are kept within the range of about 10–90%-:5–85%:5–40%.

DETAILED DESCRIPTION OF THE INVENTION

This invention relates to the flame retarding of cellulosic boards. More particularly, it concerns novel, synergistically performing three-component flame-retarding agents capable of imparting Class I or better fire rating to cellulosic boards.

For the purposes of the invention, the term "cellulosic board" encompasses boards, such as hardboards, particleboards and fiberboards, which are made of cellulosic materials of the group of wood fibers, sawdust, wood particles or chips, bagasse, cellulose fibers of all grades.

The expressions "aluminous" material or a "source of $Al_2O_3.xH_2O$" refer to materials containing $Al_2O_3.xH_2O$, where $x$ is in the range of about 0.5–3.0 and include bauxite or whatever source. Thus, the aluminous materials usable for the purposes of the instant invention range from bauxite, containing at least 45% by weight $Al_2O_3$ (the weight being based on bauxite ignited for 1 hour at 1000° C.), $Al_2O_3.3H_2O$, commonly referred to as "alumina hydrate", "hydrated alumina" or "aluminum hydroxide" including mixtures of bauxite and alumina hydrates. Compositions of typical bauxites are shown in Table I.

TABLE I

| | Analyses of Typical Bauxites | | | | | | |
| --- | --- | --- | --- | --- | --- | --- | --- |
| | | | | Origin | | | |
| Main Constituents | Jamaica | Surinam | Brazil | Australia (Weipa) | France | Hungary | Greece |
| $Al_2O_3$ | 48.0 | 55.4 | 58.4 | 58.8 | 56.5 | 50.1 | 60.2 |
| $Fe_2O$ | 20.0 | 11.7 | 7.4 | 6.8 | 24.9 | 18.7 | 21.7 |
| $SiO_2$ | 1.6 | 2.4 | 2.0 | 5.5 | 3.7 | 6.0 | 3.1 |
| $TiO_2$ | 2.6 | 0.7 | 1.1 | 2.3 | 2.6 | 2.5 | 3.0 |
| CaO | 0.1 | 0.1 | 0.1 | <0.02 | 0.1 | 0.5 | 0.1 |
| Loss on Ignition at 1000° C | | | | | | | |

TABLE I-continued

| Main Constituents | Analyses of Typical Bauxites Origin | | | | | | |
|---|---|---|---|---|---|---|---|
| | Jamaica | Surinam | Brazil | Australia (Weipa) | France | Hungary | Greece |
| for 1 hour | 26.3 | 29.5 | 30.8 | 26.4 | 12.2 | 21.8 | 11.7 |

The boron-containing, naturally occurring mineral employed by the instant invention as one of the components of the flame-retarding agent is a calcium borate and includes as the preferred minerals ulexite, having the generally accepted formula of $Na.CaB_5O_9.8H_2O$, sometimes also defined as $Na_2O.2CaO.B_2O_3.16H_2O$; and colemanite, having the formula of $Ca_2B_6O_{11}.5H_2O$; or mixtures of these, a naturally occurring mixture being Gerstley borate. Other naturally occurring calcium-boron containing minerals, although rarer in appearance, are also included, such as pandermite, meyerhofferite and inyoite.

The third component of the three-component flame-retarding agent, also referred to in the instant specification as "cosynergist", is a phosphate or sulfate-containing inorganic salt. Suitable cosynergists for the purposes of the invention are characterized by the general formulae: $M_mHSO_4$, $M_m(HPO_4)_n$, $M_m(H_2PO_4)_n$, where M is Na, K, $NH_4$ Mg and Al and n depends in the valency of M; $Ca(H_2PO_4)_2$, $X_mH_{4-m}P_2O_7$ where X is Na, K, Mg and $NH_4$ and m depends on the valency of X; $Na_3PO_4$ and the polymeric phosphates of Na and K, such as Na or K-hexametaphosphates and also $K_3PO_4$.

The expression "Class I fire rating", as used herein, refers to a flame spread defined in ASTM E 84-76a method for building materials as measured in a 25-foot (7.62 m) tunnel. In the instant case, flame spread measurements were carried out in a 2-foot (0.61 m) inclined tunnel substantially equivalent to the tunnel described by Levy in the Journal of Cellular Plastics, pp. 168-173 (April 1967). In that article, a correlation is presented between the results obtained in the 2-foot tunnel and the 25-foot tunnel.

Although in the following description the flame-retarding agent of the instant invention is employed as a mixture of the three or more individual components, it is to be understood that it is not necessary to premix the components prior to incorporation in the cellulosic boards. It is entirely possible to premix only two of the components of the flame-retarding agent and to add the remaining component to the board, or if desired, the components of the agent can be individually incorporated in the cellulosic boards during the board manufacturing process. In any event, whether the agent is added to the board forming process in a premixed form or as individual components, care is to be taken to obtain substantially uniform distribution within the cellulosic board forming materials to obtain the desired optimum flame-retarding effect.

The quantity of flame-retarding agent to be incorporated in the cellulosic boards depends on the flame-retarding effect to be achieved. Thus, it has been discovered that in order to obtain flame spreads corresponding to Class I fire rating, the cellulosic board should contain from about 35% to about 50% by weight flame-retarding agent based on the weight of the flame-retarded board, regardless of the type of cosynergist and/or aluminous material utilized. Naturally, if one desires lower loadings, for example, in the range of about 25-35%, with correspondingly increasing flammability, such as defined for Class II fire-rated materials, the instant flame-retarding agent can be used in lower quantities, without, however, departing from the scope and spirit of the invention.

Higher quantities than indicated above can also be added to the cellulosic boards; however, the possible increase of flame retardancy of the boards can be detrimentally offset by a decrease in strength, undesirable appearance and potential processing problems.

The instant flame-retarding composition as mentioned above is a mixture of components A, B and C. Component A, which is an aluminous material, as defined hereinabove, is generally present in the mixture in an amount equivalent to about 10% to about 90% by weight of the mixture. Component B, consisting of ulexite, colemanite and their mixtures, is usually employed in an amount corresponding to about 5% to about 85% of the total weight of the flame-retarding agent. Component C, selected from the group of inorganic sulfates and phosphates, is present in the agent in an amount ranging from about 5% to about 40% by weight of the mixture.

For optimum results in terms of imparting flame retardancy to cellulosic boards, the weight ratios of A:B:C in the flame-retarding mixture are generally kept within the following limits: 40-75:20-60:5-30.

Incorporation of the instant flame-retarding composition in the cellulosic boards, whether as a mixture or by sequential addition of the individual components, can proceed in several ways depending on the type of board to be produced and also on the type of board manufacturing method selected. Two main types of manufacturing processes are known to the cellulosic board producing trade and these can be designated as the "dry" process and the "wet" process. Although there may be variations within each of these methods as practiced by different plants, the principle of manufacture for each of these main types remains essentially the same regardless of the plant location. Both the "dry" and the "wet" processes have been extensively described in the art and the following U.S. patents provide some insight for these methods. Thus, U.S. Pat. Nos. 3,966,540 (Selander et al) provides a description of the "dry" process, while 3,873,662 (Cartlidge et al) concerns the production of particleboards by the "wet" method.

The instant synergistically acting flame-retarding agent can be readily utilized in both of the wet and dry cellulosic board producing methods, provided the distribution of the agent within the boards is kept at a substantially uniform manner. Unless a substantially uniform distribution is achieved, locally there may occur too low or too high concentrations which can affect the board's physical and/or esthetical properties and can also lead to nonuniform flame retardancy of the board. In the "dry" board producing method, substantially uniform distribution of the flame retarding agent can be insured, for example, by employing cellulosic materials having a moisture content between about 20-40% by weight.

The following examples demonstrate the synergistic flame-retarding effect obtained for cellulosic boards by use of the novel, three-component system of the invention.

EXAMPLE I

A series of flame-retarded hardboards was made from dry, unbleached wood fibers by incorporating in the boards the novel, three-component flame-retarding agent. All of the boards had an equal loading of 45% by weight flame-retarding agent and for the test only the type of the "C" component of the agent, e.g., the inorganic sulfate or phosphate component, was varied. Within the agent, the weight ratios of the component were being kept constant in all of the mixtures at 45%:45%:10%.

For each board, 260 grams of fluffed fiber was charged into a container of 19 liter (5 gallons) capacity. The container was closed, then tumbled at an angle, while through an opening, an aqueous resin binder composition, containing 27 grams of phenolformaldehyde resin dispersed in 130 ml water, was added. Subsequently, 213 grams flame-retarding agent, composed of a mixture of A+B+C, was added, and the admixture was vigorously mixed. The admixture was then transferred to a sheet mold of 25.4 × 25.4 cm (10 inches × 10 inches) size and compacted with a metal plate. The admixture, now in a mat form, was then further compacted in a platen press without employing heat, then the compacted mat was transferred to a perforated aluminum plate on which it was pressed into a board. The board was prepared by using a platen temperature of about 215° C. (419° F.) with an initial force of about 19 tons (380 psi) for 1.5 minutes, followed by a 4-minute pressure treatment at about the same temperature using a pressure of 7.5 tons (140 psi). The finished boards were stored for 12-14 hours, then specimens of about 8 × 25 cm (3¼ inches × 10 inches) were cut for flame retardancy testing. For comparison purposes, the following boards were also prepared by the same method: (a) control board with no flame retardant agent; (b) board with a 1:1 mixture of alumina hydrateulexite; (c) board with alumina hydrate only; (d) board with ulexite only and (e) board with $Ca(H_2PO_4)_2$ only. In boards (b)-(c), the loading of the additives was at the same level as in the boards prepared with the novel, three-component agent. Specimens from boards (a)-(e) were also subjected to flame retardancy testing. The flame retardancies exhibited by all specimens were tabulated and are shown in Table II.

TABLE II

Flammability of Hardboards Using Different Flame-Retarding Compositions

| Flame-Retardant Composition Incorporated in the Hardboard Specimen | Flame Spread* in inches | After-glow |
|---|---|---|
| Control (none) | >18 | — |
| Alumina hydrate | 16 | No |
| Ulexite | 15½ | Yes |
| $Ca(H_2PO_4)_2$ | 13¾** | No |
| Alumina hydrate:ulexite (1:1 mixture) | 14 | No |
| Bauxite (Jamaican)-ulexite (1:1 mixture) | 14 | Yes |
| Alumina hydrate-ulexite-$Ca(H_2PO_4)_2$ | 13¼ | No |
| Alumina hydrate-ulexite-$NaH_2PO_4 \cdot H_2O$ | 13 | No |
| Alumina hydrate-ulexite-$Na_2HPO_4 \cdot 7H_2O$ | 13 | No |
| Alumina hydrate-ulexite-$Na_3PO_4 \cdot 12H_2O$ | 13¼ | No |
| Alumina hydrate-ulexite-$NH_4H_2PO_4$ | 13½ | No |
| Alumina hydrate-ulexite-$(NH_4)_2HPO_4$ | 13½ | No |
| Alumina hydrate-ulexite-$NH_4$-polyphosphate | 13½ | No |
| Alumina hydrate-ulexite-$NaHSO_4 \cdot H_2O$ | 13 | No |
| Alumina hydrate-ulexite-$NH_4HSO_4$ | 13¾ | No |
| Bauxite (Jamaican)-ulexite-$Ca(H_2PO_4)_2$ | 13¼ | No |
| Alumina hydrate-ulexite-$KHSO_4$ | 13¼ | No |
| Alumina hydrate-ulexite-$KH_2PO_4$ | 13¼ | No |
| Alumina hydrate-ulexite-$Na_2H_2P_2O_7$ | 12¾ | No |

*Boards having a flame spread in excess of 14 inches do not qualify for Class I fire rating. Flame spread measurements were carried out according to Levy, J. of Cellular Plastics, pp. 168-173 (April 1967).
**Board disintegrated partially due to low strength The results shown in Table II clearly indicate that the novel flame-retarding compositions impart improved flame retardancy to cellulosic boards significantly beyond the additive results expected from the combination of the constituents. This denotes true synergism unexpectedly generated by the components of the instant flame-retarding agents.

Tests have also been conducted with ammonium sulfate $[(NH_4)_2SO_4]$, $Al_2(SO_4)_3 \cdot 18H_2O$, $AlPO_4$ and dibasic calcium phosphate ($CaHPO_4$), which judging from the behavior of the rest of the salts in the class, should also have imparted a synergistic flame-retarding effect to cellulosic hardboards. Surprisingly, these salts were found to be ineffective in obtaining a Class I fire rating for cellulosic boards under the manufacturing and testing conditions described in Example I. This further strengthens the uniqueness of the compositions disclosed and claimed.

Tests have also been performed for establishing the effective loading of the novel flame-retarding agent in cellulosic boards. These tests are described in Example II.

EXAMPLE II

A series of hardboards were prepared according to the method described in Example I. In this series, an alumina hydrateulexite-$Ca(H_2PO_4)_2$ composition was used as the flame-retarding agent at loadings varying between about 25% and 60% by weight based on the weight of the flame-retarded boards. The weight ratio of alumina hydrate:ulexite:$Ca(H_2PO_4)_2$ was established at 45:45:10. From the boards specimens were taken for flame spread testing according to the method referred to above and the results are shown in Table III.

TABLE III

Flammability of hardboards at varying loadings of alumina hydrate-ulexite-$Ca(H_2PO_4)_2$ flame retarding agent

| Loading in % by wt. of flame-retarded board | Flame spread inches | Afterglow | Remarks |
|---|---|---|---|
| 25 | 17½ | Yes | |
| 30 | 15¼ | Yes | |
| 35 | 14¾ | Yes | |
| 40 | 14 | No | |
| 45 | 13 | No | |
| 60 | 12¾ | No | Poor phys. prop. |

It can be seen that for the particular composition employed, loadings below about 40% by weight do not provide Class I fire rating, while at loadings in the range of about 60% by weight of the flame-retarded board, the physical strength of the board did not meet requirements.

EXAMPLE III

Tests were also conducted using colemanite as the naturally occurring Ca-borate mineral. The boards for this example were prepared in accordance with the method shown in Example I using a 35% by weight loading. For control purposes, boards were also made containing colemanite only, alumina hydrate only and a 70:30 mixture of alumina hydrate with colemanite. As a cosynergist $(NH_4)_2HPO_4$ was selected. The results of the flameability tests are shown in Table IV.

Table IV

| Flammability of hardboard using colemanite in the flame-retarding composition | | |
|---|---|---|
| Composition | Flame Spread inches | Afterglow |
| Colemanite | 17 | Yes |
| Alumina hydrate | 16.5 | No |
| Alumina hydrate-colemanite 70:30 mixture | 15 | Yes |
| Alumina hydrate-colemanite-$(NH_4)_2HPO_4$ 68.25:28.25:3.5 mixture | 14 | No |

Experiments were also conducted for the manufacture of flame-retarded hardboards by the wet method using the novel, three-component flame-retarding agent. The boards produced in this manner also exhibited the excellent flame retardancy shown above.

To establish the universal application of the novel flame-retarding agent to boards other than hardboards, a number of experiments were also conducted with particle- and fiberboards. While there were minor variations in the flame spread results, these were found to be insignificant and within the experimental error of the method employed. This showed the adaptability of the novel flame-retarding compositions for cellulosic boards other than hardboards.

It is also to be understood that the term "cellulosic board" includes boards which have a core made of cellulosic materials and facing layers on one or both sides, which may be either of cellulosic materials or other materials known in the art. In case of such two- or three-layer composites, the quantity of flame retardant incorporated in the core and in the facing layer may vary. In any event, however, to obtain the flame retardancy described hereinbefore, the total quantity of agent in the composite, regardless of distribution, is kept within the ranges shown.

Although the invention has been described in great detail, it is not limited to the specific embodiments shown in the examples, only by the extent and scope of the appended claims.

What is claimed is:

1. Flame retardant composition for cellulosic boards consisting essentially (A) a source of $Al_2O_3.xH_2O$; (B) a naturally occurring calcium-borate mineral; and (C) an inorganic sulfate or phosphate-containing salt, wherein (A) is selected from the group of $Al_2O_3.xH_2O$, where x is in the range of about 0.5-3.0, bauxite and mixtures thereof; (B) is selected from the group of ulexite, colemanite and mixtures thereof; and (C) is selected from the group of salts having the formulae $M_mHSO_4$, $M_m(HPO_4)_n$, $M_m(H_2PO_4)_n$, $X_mH_{4-m}P_2O_7$, where M is Na, K, $NH_4$, Mg and Al and X is Na, K, Mg and $NH_4$ and m and n depend on the valency of M, $Ca(H_2PO_4)_2$, $K_3PO_4$, $Na_3PO_4$ and the metaphosphates of Na and K; and wherein in the flame retardant composition, the percent weight ratios of A:B:C are kept within the range of about 10-90:5-85:5-40.

2. Flame retardant composition of claim 1, wherein the percent weight ratios of A:B:C are kept within the range of about 40-75:20-60:5-30.

3. Flame retardant composition of claim 1, wherein A is $Al_2O_3.3H_2O$ or bauxite, B is ulexite or colemanite and C is $Ca(H_2PO_4)_2$.

4. Flame retardant composition of claim 1, wherein A is $Al_2O_3.3H_2O$ or bauxite, B is ulexite or colemanite and C is $NaHSO_4$.

5. Flame retardant composition of claim 1, wherein A is $Al_2O_3.3H_2O$ or bauxite, B is ulexite or colemanite and C is $Na_2H_2P_2O_7$.

6. Flame retardant composition of claim 1, wherein A is $Al_2O_3.3H_2O$ or bauxite, B is ulexite or colemanite and C is selected from the group consisting of $NH_4H_2PO_4$, $(NH_4)_2HPO_4$ and ammonium polyphosphate.

7. A flame-retarded cellulosic board containing a flame retardant composition consisting essentially (A) a source of $Al_2O_3.xH_2O$; (B) a naturally occurring calcium-borate mineral and (C) an inorganic sulfate or phosphate-containing salt, wherein (A) is selected from the group of $Al_2O_3.xH_2O$, where x is in the range of about 0.5-3.0, bauxite and mixtures thereof; (B) is selected from the group of ulexite, colemanite and mixtures thereof; and (C) is selected from the group of salts having the formulae $M_mHSO_4$, $M_m(HPO_4)_n$, $M_m(H_2PO_4)_n$, $X_mH_{4-m}P_2O_7$, where M is Na, K, $NH_4$, Mg and Al and X is Na, K, Mg or $NH_4$ and m and n depend on the valency of M, $Ca(H_2PO_4)_2$, $K_3PO_4$, $Na_3PO_4$ and the metaphosphates of Na and K; and wherein in the flame retardant composition, the percent weight ratios of A:B:C are kept within the range of about 10-90:5-85:5-40; and wherein the quantity of flame retardant composition in the board is kept within the range of about 25 to about 50% by weight of the flame-retarded board.

8. Board according to claim 7, wherein the percent weight ratios of A:B:C are kept within the range of about 40-75:20-60:5-30 and the quantity of flame retardant composition in the board is kept within the range of about 35 to about 50% by weight of the flame-retarded board.

9. Board according to claim 7, wherein A is $Al_2O_3.3H_2O$ or bauxite, B is ulexite or colemanite and C is $Ca(H_2PO_4)_2$.

10. Board according to claim 7, wherein A is $Al_2O_3.3H_2O$ or bauxite, B is ulexite or colemanite and C is $NaHSO_4$.

11. Board according to claim 7, wherein A is $Al_2O_3.3H_2O$ or bauxite, B is ulexite or colemanite and C is $Na_2H_2P_2O_7$.

12. Board according to claim 7, wherein A is $Al_2O_3.3H_2O$ or bauxite, B is ulexite or colemanite and C is selected from the group consisting of $NH_4H_2PO_4$, $(NH_4)_2HPO_4$ and ammonium polyphosphates.

* * * * *